(12) United States Patent
Bronfenbrenner et al.

(10) Patent No.: US 9,878,958 B2
(45) Date of Patent: Jan. 30, 2018

(54) DIMENSIONAL CONTROL OF CERAMIC STRUCTURES VIA COMPOSITION

(71) Applicant: Corning Incorporated, Corning, NY (US)

(72) Inventors: David J Bronfenbrenner, Painted Post, NY (US); Michael James Lehman, Canisteo Post, NY (US)

(73) Assignee: Corning Incorporated, Corning, NY (US)

(*) Notice: Subject to any disclaimer, the term of this patent is extended or adjusted under 35 U.S.C. 154(b) by 635 days.

(21) Appl. No.: 13/770,119

(22) Filed: Feb. 19, 2013

(65) Prior Publication Data

US 2013/0224431 A1    Aug. 29, 2013

Related U.S. Application Data

(60) Provisional application No. 61/604,715, filed on Feb. 29, 2012.

(51) Int. Cl.
| | | |
|---|---|---|
| *B28B 17/00* | (2006.01) |
| *C04B 38/00* | (2006.01) |
| *C04B 35/195* | (2006.01) |
| *C04B 35/626* | (2006.01) |
| *C04B 35/636* | (2006.01) |
| *C04B 38/06* | (2006.01) |

(52) U.S. Cl.
CPC ...... *C04B 38/0006* (2013.01); *B28B 17/0072* (2013.01); *C04B 35/195* (2013.01); *C04B 35/6263* (2013.01); *C04B 35/6365* (2013.01); *C04B 38/067* (2013.01); *C04B 38/068* (2013.01); *C04B 38/0675* (2013.01); *C04B 2235/3201* (2013.01); *C04B 2235/322* (2013.01); *C04B 2235/3203* (2013.01); *C04B 2235/3206* (2013.01); *C04B 2235/3208* (2013.01); *C04B 2235/3215* (2013.01); *C04B 2235/3217* (2013.01); *C04B 2235/3218* (2013.01); *C04B 2235/3225* (2013.01); *C04B 2235/3227* (2013.01); *C04B 2235/34* (2013.01); *C04B 2235/3409* (2013.01); *C04B 2235/3418* (2013.01); *C04B 2235/3445* (2013.01); *C04B 2235/3463* (2013.01); *C04B 2235/36* (2013.01); *C04B 2235/72* (2013.01); *C04B 2235/80* (2013.01); *C04B 2235/9615* (2013.01); *C04B 2235/9638* (2013.01); *Y10T 428/24149* (2015.01)

(58) Field of Classification Search
CPC ............ C04B 38/0006; C04B 35/6365; C04B 35/6263; C04B 35/195; B28B 17/0072
USPC ....... 264/630, 631, 634, 644, 652, 672, 40.1
See application file for complete search history.

(56) References Cited

U.S. PATENT DOCUMENTS

| | | | | |
|---|---|---|---|---|
| 4,434,117 A | | 2/1984 | Inoguchi et al. ................ 264/56 |
| 4,716,029 A | * | 12/1987 | Oguri ...................... C01F 7/448 |
| | | | | 423/625 |
| 5,429,779 A | | 7/1995 | Locker et al. ................ 264/40.1 |
| 5,741,357 A | * | 4/1998 | Sheikh ................ C04B 20/1088 |
| | | | | 106/692 |
| 6,214,437 B1 | | 4/2001 | Beall et al. .................... 428/116 |
| 6,447,597 B1 | * | 9/2002 | Repette ................. C04B 22/143 |
| | | | | 106/692 |
| 6,506,336 B1 | | 1/2003 | Beall et al. .................... 264/630 |
| 6,562,284 B2 | | 5/2003 | Beall et al. .................... 264/631 |
| 6,733,703 B2 | * | 5/2004 | Billiet .................... B22F 1/0059 |
| | | | | 257/E21.504 |
| 8,366,978 B2 | * | 2/2013 | Koebel .............. A61C 13/0004 |
| | | | | 264/18 |
| 8,894,915 B2 | | 11/2014 | Ono |
| 9,315,993 B2 | * | 4/2016 | O'Donnell ............ B32B 23/048 |
| 2002/0130447 A1 | | 9/2002 | Beall et al. .................... 264/630 |
| 2004/0097362 A1 | * | 5/2004 | Addiego .................. B01J 21/04 |
| | | | | 501/127 |
| 2006/0027951 A1 | * | 2/2006 | Peterson ................ C04B 35/185 |
| | | | | 264/631 |
| 2008/0010960 A1 | * | 1/2008 | Paisley ................. C04B 35/478 |
| | | | | 55/523 |
| 2008/0315468 A1 | | 12/2008 | Ono .............................. 264/631 |
| 2009/0137382 A1 | | 5/2009 | Merkel ........................... 502/60 |
| 2009/0220736 A1 | | 9/2009 | Merkel ......................... 428/116 |
| 2010/0156010 A1 | * | 6/2010 | Merkel ................. C04B 35/195 |
| | | | | 264/628 |
| 2010/0329975 A1 | * | 12/2010 | Addiego .............. C04B 35/195 |
| | | | | 423/700 |
| 2011/0045233 A1 | | 2/2011 | Gray et al. .................... 428/116 |
| 2011/0049741 A1 | * | 3/2011 | Brown ...................... B28B 3/20 |
| | | | | 264/40.1 |
| 2011/0053757 A1 | | 3/2011 | Caffery et al. ................ 501/127 |

(Continued)

FOREIGN PATENT DOCUMENTS

| | | | |
|---|---|---|---|
| JP | 05208875 A | 8/1993 | |
| WO | WO2008/052807 A2 * | 5/2008 | ......... A61C 13/0004 |

OTHER PUBLICATIONS

English Translation of CN201380021443.2 Fourth Office Action Dated Mar. 8, 2017, China Patent Office.

*Primary Examiner* — Nahida Sultana
(74) *Attorney, Agent, or Firm* — Jakub M. Michna; Jospeh M. Homa

(57) ABSTRACT

Disclosed herein are methods for controlling and/or predicting the shrinkage and/or growth of a ceramic honeycomb structure between a green body state and a fired state by adjusting the hydrated alumina content of the batch composition. Also disclosed herein is substantially clay-free cordierite honeycombs produced in accordance with such methods.

14 Claims, 1 Drawing Sheet

(56) References Cited

U.S. PATENT DOCUMENTS

| | | | | |
|---|---|---|---|---|
| 2011/0059289 A1* | 3/2011 | Snowdon | ............ | B32B 23/048 |
| | | | | 428/99 |
| 2011/0236625 A1* | 9/2011 | Kikuchi | ............ | B01D 53/9413 |
| | | | | 428/116 |
| 2011/0287921 A1* | 11/2011 | Uoe | ................. | B01D 39/2075 |
| | | | | 501/32 |
| 2012/0003464 A1* | 1/2012 | Uoe | .................... | C04B 35/478 |
| | | | | 428/310.5 |
| 2014/0031479 A1* | 1/2014 | Rex | ...................... | C08K 3/04 |
| | | | | 524/436 |

* cited by examiner

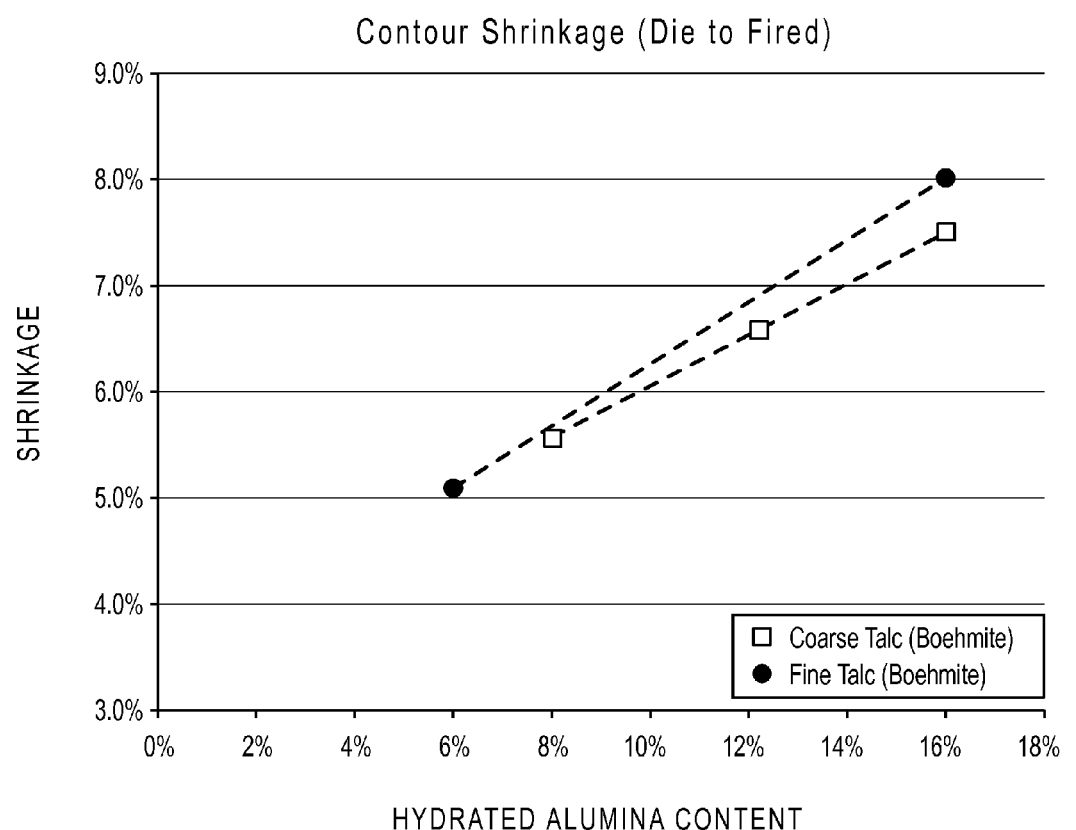

DIMENSIONAL CONTROL OF CERAMIC STRUCTURES VIA COMPOSITION

This application claims the benefit of priority under 35 U.S.C. § 119 of U.S. Provisional Application Ser. No. 61/604,715 filed on Feb. 29, 2012 the content of which is relied upon and incorporated herein by reference in its entirety.

FIELD OF THE DISCLOSURE

The disclosure relates to methods for controlling shrinkage and/or growth of ceramic structures, such as between a green body state and a fired state. Exemplary methods may include adjusting the hydrated alumina content of the batch composition. Compositions and products obtained using these methods are also disclosed.

BACKGROUND

Ceramic structures, including substrates, are useful in a variety of applications. By way of non-limiting example, ceramic honeycomb structures or bodies may be selectively plugged and used in diesel particulate filters ("DPFs"), membrane separations, and flow-through catalytic converters. However, the ability to reliably produce extrude-to-shape ceramic honeycomb structures is generally dependent on the ability to minimize variability in production, e.g. how much the ceramic honeycomb structure shrinks or grows during the firing and/or drying process. Because ceramic honeycomb structures may be placed in a housing, for example when used as a DPF, there are various specifications for the shape and/or size of the honeycomb. For example, certain applications may require that the shrinkage or growth of the honeycomb structure after firing and/or drying does not vary by more than ±0.5% from the targeted value in order to ensure that the final product can fit into a particular housing. In further exemplary applications, the variation can be no more than about ±0.3% from the targeted value.

Several different methods for controlling the shrinkage and/or growth of ceramics during firing have been employed, such as, for example, batch compositional changes, raw material beneficiation, firing process changes, and fired ware cutting in combination with artificial skinning. However, there is a continuing desire in the industry to provide additional methods for controlling the shrinkage and/or growth of ceramic structures, such as honeycomb bodies, particularly between a green body state and a fired state. In particular, there is a need for methods of controlling the shrinkage and/or growth of ceramic structures with compositions other than traditional cordierite, for example, substantially clay-free cordierite honeycombs.

SUMMARY

The disclosure relates, in various embodiments, to methods for predicting and/or controlling the shrinkage and/or growth of ceramic honeycomb structures by adjusting the hydrated alumina content of the batch composition. In certain embodiments, the methods disclosed can be used to control and/or predict the shrinkage and/or growth of substantially clay-free cordierite honeycombs.

In certain embodiments, methods of controlling the shrinkage and/or growth of ceramic honeycomb structures between a green body state and a fired state comprise steps of (a) providing a batch composition suitable for making a ceramic honeycomb structure; (b) extruding the batch composition into a green honeycomb structure; (c) measuring the dimensions of the green honeycomb structure; (d) firing the green honeycomb structure; (e) measuring the dimensions of the fired honeycomb structure; (f) determining the shrinkage or growth of the fired honeycomb structure as compared to the green honeycomb structure; (g) adjusting the hydrated alumina content of the composition by the addition of a selected amount of at least one hydrated alumina to the batch composition; and (h) repeating steps (a)-(g) as necessary to obtain a desired level of shrinkage or growth between the green body and fired states.

In further embodiments, methods of controlling the shrinkage and/or growth of ceramic honeycomb structures between a green body state and a fired state comprise the steps of (a) providing a batch composition suitable for making a ceramic honeycomb structure; (b) analyzing the hydrated alumina content of the batch composition; (c) adjusting the hydrated alumina content of the batch composition by the addition of a predetermined amount of at least one hydrated alumina to the batch composition; (d) extruding the adjusted batch composition into a green honeycomb structure; (e) measuring the dimensions of the green honeycomb structure; (f) firing the green honeycomb structure; (g) measuring the dimensions of the fired honeycomb structure; (h) determining the shrinkage or growth of the fired honeycomb structure as compared to the green honeycomb structure; and (i) repeating steps (b)-(h) as necessary to obtain a desired level of shrinkage or growth between the green body and fired states.

In yet further embodiments, methods of making ceramic honeycomb structures comprise the steps of (a) providing a batch composition suitable for making a ceramic honeycomb structure; (b) adjusting the hydrated alumina content of the batch composition by the addition of a at least one hydrated alumina in an amount up to about 50% by weight relative to the total weight of the batch composition; (c) extruding the adjusted batch composition into a green honeycomb structure; and (d) firing the green honeycomb structure. According to various embodiments, the hydrated alumina content of the batch composition may be adjusted such that the hydrated alumina contributes a total stoichiometric amount of alumina of up to about 50%, based on the total weight of the batch composition.

Further embodiments of the disclosure also relate to compositions for use in ceramic honeycomb structures, wherein the compositions comprise added hydrated alumina. By way of non-limiting example, disclosed herein is a cordierite honeycomb having a hydrated alumina content such that the hydrated alumina contributes a total stoichiometric amount of alumina of up to about 32%, based on the total weight of the batch composition, wherein the batch composition is substantially free of clay.

BRIEF DESCRIPTION OF THE DRAWINGS

The disclosure can be understood from the following detailed description, either alone or together with the accompanying drawing. The drawing is included to provide a further understanding of the disclosure, and is incorporated in and constitutes part of this specification. The drawing illustrates one or more exemplary embodiments and, together with the description, serves to explain various principles and operation.

The FIGURE is a graph depicting the contour shrinkage of two substantially clay-free cordierite compositions from a green body (die) state to a fired state as a function of hydrated alumina content, according to exemplary embodiments of the disclosure.

DESCRIPTION OF EXEMPLARY EMBODIMENTS

This disclosure relates, in various embodiments, to methods of controlling the shrinkage and/or growth of a ceramic honeycomb structure between a green body state and a fired state by adjusting the hydrated alumina content of the batch composition.

According the various embodiments, the shrinkage and/or growth of a substantially clay-free cordierite honeycomb structure between a green body state and a fired state may be controlled and/or predicted by adjusting the hydrated alumina content of the batch composition. For example, the amount of hydrated alumina, such as boehmite or aluminum tri-hydrate, present in the batch composition may be increased or decreased as necessary to achieve a desired level of shrinkage or growth.

The terms "green body state," "green honeycomb," "green honeycomb structure," and other variations thereof are used interchangeably herein to denote an unfired, unreacted precursor composition that has been mixed and/or plasticized and/or extruded. The green body may optionally be dried, but has not undergone calcination, sintering, or any other reactive firing process.

The terms "fired state," "fired honeycomb," "fired honeycomb structure," and other variations thereof are used interchangeably herein to denote a ceramic article that has undergone firing under conditions effective to convert the precursor composition into a ceramic composition comprising a sintered phase. The ceramic article may optionally undergo calcination during the firing process.

The shrinkage and/or growth of a honeycomb structure between a green body state and a fired state may be measured from the time the honeycomb is extruded to the time the honeycomb is fired to produce a ceramic. Alternatively, the shrinkage and/or growth of a honeycomb structure between a green body state and a fired state may be measured from the time the honeycomb is extruded and substantially dried to the time the honeycomb is fired to produce a ceramic.

The terms "batch composition," "precursor composition," and variations thereof are used interchangeably herein to denote a substantially homogenous mixture comprising at least one inorganic ceramic-forming component. In various exemplary embodiments of the present disclosure, the at least one inorganic ceramic-forming component may be chosen from any component suitable to form a desired ceramic composition, for example, alumina sources, silica sources, and magnesia sources. At least one inorganic ceramic-forming component may, in certain embodiments, be in the form of a reactive powder.

Exemplary sources of alumina include, but are not limited to, materials that, when heated to a sufficiently high temperature, alone or in the presence of other materials, will yield aluminum oxide. Non-limiting examples of suitable alumina sources include alpha-alumina; transition aluminas such as gamma, theta, chi, and rho aluminas; hydrated alumina; gibbsite; corundum; boehmite; pseudoboehmite; aluminum hydroxide; aluminum oxyhydroxide; diaspore; and mixtures thereof.

Exemplary sources of silica include, but are not limited to, non-crystalline silica, such as fused silica and sol-gel silica; crystalline silica, such as zeolite, quartz, and cristobalite; silicone resin; diatomaceous silica; kaolin; talc; and mullite. In other embodiments, the silica source may be chosen from silica-forming sources comprising at least one compound that forms free silica when heated, such as, for example, silicic acid and silicone organometallic compounds.

Sources of magnesium include, but are not limited to, talc, magnesite ($MgCO_3$), and any materials that, when heated to a sufficiently high temperature, alone or in the presence of other materials, will yield magnesium oxide.

The batch composition may, in various embodiments, be chosen so as to be substantially free of clay. In these embodiments, the batch composition may be substantially free of clays such as kaolin. The preparation of substantially clay-free cordierite structures is described, for example, in U.S. Pat. No. 7,704,296 and U.S. Patent Application Publication No. 2009/0220736, both of which are incorporated herein by reference in their entireties. According to various exemplary embodiments, the batch composition may comprise less than about 1% by weight of clay, for example, less than about 0.5% by weight of clay, or less than about 0.1% by weight of clay.

According to various exemplary embodiments of the disclosure, the batch mixture may further comprise at least one additional inorganic material, such as oxides (e.g. lanthanum oxide), carbonates (e.g. calcium carbonate and strontium carbonate), nitrates, and hydroxides. In at least one embodiment, the at least one additional inorganic material may be chosen from glass-forming metal oxides such as yttrium oxide, lanthanum oxide, barium oxide, sodium oxide, potassium oxide, lithium oxide, calcium oxide, iron oxide, boric oxide, and phosphorous oxides. These oxides may be added as oxides, carbonates, nitrates, hydroxides, or multi-component compounds with one another or with at least one oxide chosen from titanium dioxide, aluminum oxide, silicone dioxide, calcium oxide, strontium oxide, and lanthanum oxide. The glass-forming metal oxide can, in certain embodiments, be a colloidal metal oxide that is capable of forming a colloidal suspension in a solvent. According to one embodiment, the glass-forming metal oxide may be present in the batch composition in an amount of at least about 3% by weight, for example, at least about 5%, at least about 10%, or from about 3% to about 50% by weight, such as from about 10% to about 50% by weight.

In various exemplary embodiments, the batch composition may comprise at least one other known component useful for making a batch material. For example, the batch composition may further comprise at least one additional component chosen from binders, solvents, surfactants, lubricants, and pore formers.

If desired, it is within the ability of one skilled in the art to select one or more appropriate binders. By way of example only, the at least one binder may be chosen from organic binders, such as cellulose-containing components, for example, methylcellulose, hydroxypropyl methylcellulose, methylcellulose derivatives, and combinations thereof. In certain non-limiting embodiments, the binder may be present in the batch composition in an amount ranging from about 1% to about 10% by weight, for example, from about 2% to about 6%, or about 3% to about 5%, by weight.

It is also within the ability of a skilled artisan to select an appropriate solvent, if desired. The solvent may, for example, be used to wet the inorganic ceramic-forming powders and/or to provide a medium for the binder to dissolve, thus providing plasticity to the batch composition. In various exemplary embodiments, the at least one solvent may be aqueous, for example water and water-miscible solvents, or organic, or some combination thereof. In at least one exemplary embodiment, the solvent comprises water, for example, deionized water. According to various non-limiting embodiments, the solvent is present in the batch composition in an amount ranging from about 20% to about 50% by weight, such as about 25% to about 40%, or about 30% to about 35%, by weight.

The batch composition may optionally further comprise at least one surfactant. Non-limiting examples of surfactants that can be used in accordance with various embodiments according to the disclosure include $C_8$-$C_{22}$ fatty acids and derivatives thereof; $C_8$-$C_{22}$ fatty esters and derivatives thereof; $C_8$-$C_{22}$ fatty alcohols and derivatives thereof; and combinations thereof. In certain exemplary embodiments, the at least one surfactant may be chosen from stearic acid, lauric acid, oleic acid, linoleic acid, palmitoleic acid, ammonium lauryl sulfate, derivatives thereof, and combinations thereof. According to certain non-limiting embodiments, the at least one surfactant may be present in the batch composition in an amount ranging from about 0.5% to about 2% by weight, such as about 1% by weight.

The batch composition may optionally further comprise at least one lubricant. For example, the batch composition may comprise at least one oil lubricant chosen from light mineral oil, corn oil, high molecular weight polybutenes, polyol esters, blends of light mineral oils and wax emulsions, blends of paraffin wax in corn oil, and combinations thereof. The at least one lubricant may be present in the batch composition, in certain embodiments, in an amount ranging from about 1% to about 10% by weight, for example from about 3% to about 6%, or about 4% to about 5%, by weight.

According to various embodiments, the batch composition further comprises at least one pore former. Suitable pore formers include any particulate substance that burns out of the green body during firing to create pores in the fired ceramic. Examples of pore formers include, but are not limited to, carbon pore formers, such as graphite, activated carbon, petroleum coke, and carbon black; starch pore formers, such as corn, barley, bean, potato rice, tapioca, pea, sago palm, wheat, canna, and walnut shell flours; polymer pore formers, such as polybutylene, polymethylpentene, polyethylene, polypropylene, polystyrene, polyamides (nylons), epoxies, ABS, acrylics, and polyesters (PET); and combinations thereof. According to at least one embodiment, the at least one pore former is chosen from carbon pore formers such as graphite and starch pore formers such as rice corn, sago palm, and potato. In various non-limiting embodiments, the at least one pore former is present in the batch composition in an amount ranging from about 5% to about 30% by weight, for example, from about 15% to about 30%, or about 20% to about 25%, by weight.

The batch materials may be mixed to obtain a substantially homogenous batch composition using any method known in the art. For example, the at least one inorganic ceramic-forming material may be a powder which is wetted with at least one component chosen from solvents, binders, and combinations thereof. The solvent and/or binder may be added in any amount that is suitable to wet and/or plasticize the batch. The mixing and/or plasticization of the batch may take place in any suitable mixer in which the batch will be plasticized. For example, a ribbon mixer, twin-screw extruder/mixer, auger mixer, muller mixer, or double arm mixer may be used.

According to various embodiments of the disclosure, the hydrated alumina may be chosen from boehmite (AlOOH) and aluminum tri-hydrate ($Al(OH)_3$). The hydrated alumina content of the batch material may be adjusted by adding a selected amount of hydrated alumina to the batch material, e.g. after an analysis of hydrated alumina content has been performed and/or after the shrinkage of the honeycomb from the green state to the fired state has been determined. For any given batch material, a graph may be constructed illustrating shrinkage as a function of hydrated alumina content. Such a graph could be generated by experimentally manipulating the hydrated alumina content of the batch materials to produce data points on the graph at varying intervals. For each data point, the batch materials may be extruded to form a honeycomb structure, measured in the green body state, fired using a selected firing cycle, and measured in the fired state. Thus, a shrinkage value may be obtained for any given hydrated alumina content and a graph may be generated using those data points. A non-limiting example of such a graph is given in the FIGURE. Once a linear relationship between shrinkage and hydrated alumina content is obtained for a given batch material and firing cycle, adjustment coefficients may be generated for the purposes of predictive modeling. Using these coefficients, the hydrated alumina content of the batch may be adjusted before and/or after firing to achieve a desired shrinkage level.

For instance, in one exemplary embodiment, using the coefficients generated from a graph such as that in the FIGURE, the raw materials used to form the batch composition may be preemptively analyzed to determine the hydrated alumina content of the batch composition. Using the results of this analysis, the hydrated alumina content may then be adjusted up or down to a desired amount based on predictive modeling to achieve a desired hydrated alumina content and/or shrinkage level. A green honeycomb body may then be produced from the adjusted batch composition and fired to produce a ceramic honeycomb. The resulting ceramic honeycomb may then be measured to confirm that the predicted amount of shrinkage was obtained. If the shrinkage is too high or too low, the batch composition may be further adjusted by increasing or decreasing the amount of hydrated alumina as necessary to achieve the desired amount of shrinkage.

In a further exemplary embodiment, the batch composition may be extruded into a green honeycomb, fired, and analyzed for shrinkage. Subsequently, the hydrated alumina content of the batch composition may be adjusted up or down using predictive modeling to achieve a desired shrinkage level. The dimensions of a ceramic honeycomb produced from the adjusted batch composition may then be measured to confirm that the appropriate shrinkage was obtained. If the shrinkage is too high or too low, the batch composition may be further adjusted by increasing or decreasing the amount of hydrated alumina as necessary to achieve the desired amount of shrinkage.

The hydrated alumina content of the batch composition may be increased by, for example, adding additional hydrated alumina to the composition. For example, boehmite or aluminum tri-hydrate may be added to the batch composition until the desired hydrated alumina content is achieved. In another embodiment, materials with high hydrated alumina content may be added to the batch composition until the desired hydrated alumina content is achieved. Similarly, the hydrated alumina content of the batch composition may be decreased by, for example, adding materials with low hydrated alumina content until the desired hydrated alumina content is achieved. It is within the ability of one skilled in the art to make such adjustments while properly compensating for the presence of the other components in the batch composition.

According to at least certain exemplary embodiments, the hydrated alumina content may be adjusted such that the total amount of all hydrated alumina in the composition ranges up to about 50% by weight, such as, for example, about 1% to about 32%, by weight, or about 2% to about 16% by weight. For instance, the batch composition may be adjusted such that the hydrated alumina contributes a total stoichiometric amount of alumina of up to about 50%, based on the total weight of the batch composition, for example, ranging from about 1% to about 32%, or from about 2% to about 16%. In one non-limiting example, a substantially clay-free cordierite composition may be adjusted such that the hydrated alumina contributes a total stoichiometric amount of alumina of up to about 32%, based on the total weight of the batch composition. In a further exemplary embodiment, a substantially clay-free cordierite batch composition may be adjusted such that substantially all alumina present in the batch composition is contributed by the hydrated alumina.

The batch composition may, in various embodiments, be shaped into a green honeycomb by any process known to those skilled in the art for shaping plasticized mixtures. By way of example, the batch composition may be subjected to injection-molding, extrusion, slip casting, centrifugal casting, pressure casting, or dry pressing.

The batch composition may be extruded either vertically or horizontally and the extruder may optionally employ a die. The extrusion may, in some embodiments, be performed using a hydraulic ram extrusion press, a two-stage de-airing single auger extruder, or a twin-screw mixer with a die assembly attached to the discharge end. The proper screw elements may be chosen according to the batch materials and other process conditions so as to build up sufficient pressure to force the batch composition through the die.

By extruding the batch composition, a honeycomb having a plurality of cells separated from each other by partitions or walls can be obtained. In various embodiments, a particular die may be chosen such that the honeycomb has a desired cell shape, wall thickness, and/or cell density.

The green honeycomb may optionally be dried by any conventional method known to those skilled in the art to form a green honeycomb. For instance, the green honeycomb may be dried using hot-air drying, dielectric drying, microwave drying, drying under reduced pressure, vacuum drying, or freeze drying.

In various exemplary embodiments, the green honeycomb may then be fired to form a ceramic honeycomb. It is within the ability of one skilled in the art to determine the appropriate method and conditions for forming a ceramic honeycomb, such as, for example, firing conditions including equipment, temperature and duration. Such methods and conditions may depend, for example, upon the size and composition of the green honeycomb, as well as the desired properties of the ceramic honeycomb.

The green honeycomb may be fired at a selected temperature under a suitable atmosphere for a time dependent upon the composition, size, and geometry of the green honeycomb. For example, the temperature at which firing occurs may range from about 1300° C. to about 1450° C., and the firing time may range from about 1 to about 200 hours, for instance, from about 3 to about 100 hours, or from about 20 to about 50 hours.

Optionally, the green honeycomb may be calcined to burn out the optional pore former, binder, and/or surfactant, either before firing or in a temperature-rise process during firing. For instance, the binder may have a combustion temperature of about 200° C. and the pore former may have a combustion temperature ranging from about 300° C. to about 1000° C. Accordingly, the temperature at which calcination occurs may range from about 200° C. to about 1000° C., and the calcination time may range from about 10 to about 100 hours.

The dimensions of the green honeycomb and/or the fired honeycomb may be measured using any conventional method known in the art. For instance, in some embodiments, the diameter of the honeycomb may be measured. In other embodiments, the radius, height, and/or overall volume of the honeycomb may be measured.

The shrinkage and/or growth of the honeycomb from green state to fired state may, for example, be determined using the following equation:

Shrinkage %=([green size]−[fired size])/(green size)

where "size" is one of the above-mentioned measured dimensions, such as honeycomb diameter or height.

It is to be understood that the foregoing description and the following Example are exemplary and explanatory only, and is not to be interpreted as restrictive of the disclosure. Moreover, it should be understood that various features and/or characteristics of differing embodiments herein may be combined with one another. It is therefore to be understood that numerous modifications may be made to the illustrative embodiments and that other arrangements may be devised without departing from the scope of the invention. Other embodiments will be apparent to those skilled in the art from consideration of the disclosure and practice of the various exemplary embodiments disclosed herein.

It is also to be understood that, as used herein the terms "the," "a," or "an," mean "at least one," and should not be limited to "only one" unless explicitly indicated to the contrary. Thus, for example, the use of "a pore former" is intended to mean at least one pore former.

Unless otherwise indicated, all numbers used in the specification and claims are to be understood as being modified in all instances by the term "about," whether or not so stated. It should also be understood that the precise numerical values used in the specification and claims form additional embodiments of the invention, and are intended to include any ranges which can be narrowed to any two end points disclosed within the exemplary ranges and values provided. Efforts have been made to ensure the accuracy of the numerical values disclosed herein. Any measured numerical value, however, can inherently contain certain errors resulting from the standard deviation found in its respective measuring technique.

Example

Several green honeycomb bodies were prepared using batch materials comprising boehmite and either (a) fine talc clay-free cordierite or (b) coarse talc clay-free cordierite. The green honeycomb bodies were measured and then dried and fired so as to convert the green honeycomb bodies to ceramic honeycomb bodies. The shrinkage of the green body during drying and firing was measured and recorded. The results are shown in the following Table I.

TABLE I

| Batch Composition | | | | Firing | |
|---|---|---|---|---|---|
| Clay-Free Cordierite | Boehmite (wt %) | Drying Shrinkage | Firing Shrinkage | Contour Shrinkage | Height Shrinkage |
| Coarse Talc | 8 | 3.7% | 1.9% | 5.6% | 1.9% |
| | 12.25 | 4.1% | 2.7% | 6.6% | 2.5% |
| | 16 | 4.8% | 2.9% | 7.5% | 2.7% |

TABLE I-continued

| Batch Composition | | | | | Firing |
|---|---|---|---|---|---|
| Clay-Free Cordierite | Boehmite (wt %) | Drying Shrinkage | Firing Shrinkage | Contour Shrinkage | Height Shrinkage |
| Fine Talc | 6 | 2.9% | 2.2% | 5.1% | 2.1% |
| | 16 | 4.3% | 3.9% | 8.0% | 3.6% |

The contour shrinkage (die to fired) of the fine talc and coarse talc honeycombs was plotted as a function of hydrated alumina (boehmite) content and is illustrated in the FIGURE. It was surprisingly found that the contour shrinkage of the honeycomb between the green body and fired states linearly responded to the amount of hydrated alumina present in the batch materials. Specifically, as the amount of boehmite present in the batch materials increased, the amount of contour shrinkage also increased.

Using a graph such as that in the FIGURE, adjustment coefficients for a given batch composition and firing cycle may be generated. Using these coefficients, process measurements may be made by measuring the dimensions of a ceramic honeycomb produced from the batch composition. If the shrinkage is too low (i.e., the honeycomb is bigger than needed), the hydrated alumina content can be adjusted (i.e., increased) to increase the amount of shrinkage. For example, additional boehmite and/or aluminum tri-hydrate could be added to the batch composition, while properly compensating for other components. If the shrinkage is too high (i.e., the honeycomb is smaller than needed), the hydrated alumina content can be adjusted (i.e., decreased) to decrease the amount of shrinkage. The dimensions of a ceramic honeycomb produced from the adjusted batch composition may then be measured to confirm that the appropriate shrinkage was obtained. Alternatively, using the coefficients generated from a graph such as that in the FIGURE, the hydrated alumina content of a batch composition may be preemptively analyzed and adjusted as necessary to achieve a desired shrinkage level. A green honeycomb body may then be produced from the adjusted batch composition and fired to produce a ceramic honeycomb. The resulting ceramic honeycomb may then be measured to confirm that the predicted amount of shrinkage was obtained. If the shrinkage is too high or too low, the batch composition may be further adjusted by increasing or decreasing the amount of hydrated alumina as necessary to achieve the desired amount of shrinkage.

What is claimed is:

1. A method of controlling the shrinkage and/or growth of a ceramic honeycomb structure between a green body state and a fired state, the method comprising:
   (a) providing a substantially clay-free cordierite batch composition comprising a hydrated alumina content and suitable for making a ceramic honeycomb structure;
   (b) extruding the batch composition into a green honeycomb structure;
   (c) measuring the dimensions of the green honeycomb structure;
   (d) firing the green honeycomb structure;
   (e) measuring the dimensions of the fired honeycomb structure;
   (f) determining the shrinkage or growth of the fired honeycomb structure as compared to the green honeycomb structure and selecting a desired hydrated alumina content of the batch composition based on a correlation between the shrinkage or growth and the hydrated alumina content of the batch composition;
   (g) adjusting the hydrated alumina content of the composition to the desired hydrated alumina content by the addition of a selected amount of at least one hydrated alumina to the batch composition; and
   (h) repeating steps (a)-(g) as necessary to obtain a desired level of shrinkage or growth between the green body and fired states.

2. The method of claim 1, wherein the batch composition comprises at least one source of silica, alumina, magnesium, or combinations thereof.

3. The method of claim 2, wherein the batch composition further comprises at least one glass forming metal oxide source.

4. The method of claim 3, wherein the at least one glass forming metal oxide source comprises an yttrium source, a lanthanum source, or a combination thereof.

5. The method of claim 4, wherein the at least one glass forming metal oxide source comprises at least one source of calcium, potassium, sodium, lithium, iron, or combinations thereof.

6. The method of claim 1, wherein the at least one hydrated alumina is chosen from boehmite and aluminum tri-hydrate.

7. The method of claim 1, wherein the at least one hydrated alumina is added to the batch composition in an amount ranging up to about 50% by weight relative to the total weight of the batch composition.

8. A method of controlling the shrinkage and/or growth of a ceramic honeycomb structure between a green body state and a fired state, the method comprising:
   (a) providing a substantially clay-free cordierite batch composition comprising a hydrated alumina content and suitable for making a ceramic honeycomb structure;
   (b) analyzing the hydrated alumina content of the batch composition;
   (c) adjusting the hydrated alumina content of the batch composition to a desired hydrated alumina content by the addition of a predetermined amount of at least one hydrated alumina to the batch composition;
   (d) extruding the adjusted batch composition into a green honeycomb structure;
   (e) measuring the dimensions of the green honeycomb structure;
   (f) firing the green honeycomb structure;
   (g) measuring the dimensions of the fired honeycomb structure;
   (h) determining the shrinkage or growth of the fired honeycomb structure as compared to the green honeycomb structure and selecting the desired hydrated alumina content of the batch composition based on a correlation between the shrinkage or growth and the hydrated alumina content of the batch composition; and
   (i) repeating steps (b)-(h) as necessary to obtain a desired level of shrinkage or growth between the green body and fired states.

9. The method of claim 8, wherein the batch composition comprises at least one source of silica, alumina, magnesium, or combinations thereof.

10. The method of claim 8, wherein the batch composition further comprises at least one glass forming metal oxide source.

11. The method of claim 10, wherein the at least one glass forming metal oxide source comprises an yttrium source, a lanthanum source, or a combination thereof.

12. The method of claim 11, wherein the at least one glass forming metal oxide source comprises at least one source of calcium, potassium, sodium, lithium, iron, or combinations thereof.

13. The method of claim 8, wherein the hydrated alumina is chosen from boehmite and aluminum tri-hydrate.

14. The method of claim 8, wherein the at least one hydrated alumina is added to the batch composition in an amount ranging up to about 50% by weight relative to the total weight of the batch composition.

* * * * *